(12) United States Patent
Kakura

(10) Patent No.: US 7,304,967 B2
(45) Date of Patent: Dec. 4, 2007

(54) TIME SCHEDULING SYSTEM

(75) Inventor: Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 1286 days.

(21) Appl. No.: 09/988,595

(22) Filed: Nov. 20, 2001

(65) Prior Publication Data

US 2002/0061000 A1 May 23, 2002

(30) Foreign Application Priority Data

Nov. 21, 2000 (JP) ............................. 2000-354637

(51) Int. Cl.
*H04Q 7/20* (2006.01)
*H04J 3/00* (2006.01)

(52) U.S. Cl. ..................... 370/330; 370/336; 455/450

(58) Field of Classification Search ................ 370/336, 370/345, 347, 348, 337, 330
See application file for complete search history.

(56) References Cited

U.S. PATENT DOCUMENTS 5,613,203 A * 3/1997 Dupuy et al. ............... 455/436

6,400,697 B1 * 6/2002 Leung et al. ............... 370/328
6,407,993 B1 * 6/2002 Moulsley .................... 370/347
6,493,331 B1 * 12/2002 Walton et al. .............. 370/341
6,859,444 B1 * 2/2005 Vancraeynest ............. 370/331
2004/0214582 A1 * 10/2004 Lan et al. .................. 455/452.2

FOREIGN PATENT DOCUMENTS

| JP | A 60-84030 | 5/1985 |
| JP | A 8-65738 | 3/1996 |
| JP | A 9-261727 | 10/1997 |
| JP | A 10-65604 | 3/1998 |
| JP | A 2000-13870 | 1/2000 |

* cited by examiner

*Primary Examiner*—Wing Chan
*Assistant Examiner*—Gregory Sefcheck
(74) *Attorney, Agent, or Firm*—Young & Thompson (57) ABSTRACT

Time slots are allocated such that when one base station is transmitting to a terminal located in a boundary region of the respective cells of neighboring base stations, the other base stations transmit to terminals located in areas other than the boundary region, or when one on the neighboring base stations is transmitting to a terminal in a boundary region in a first sector, the other base stations transmit to terminals located in areas other than the boundary region of respective cells of those base stations in the sector opposing the first sector.

6 Claims, 4 Drawing Sheets

TIME SCHEDULING SYSTEM

BACKGROUND OF THE INVENTION

1. Field of the Invention

This invention relates to cellular mobile communications and more especially, a technology for providing multiplicity through allocating time slots by having time divisions for multiple terminals.

2. Description of Related Art

For cellular mobile communications, time division multiplexing involves multiple terminals differentiated for each time period being allocated a time slot thereby enabling multiple terminals to be employed. A problem results when transmitting from multiple different neighboring base stations at the same time however, because as there is a close distance between receiving terminals there is a great degree of interference occurring through transmission from a nearby base station to a terminal.

Figure 7:
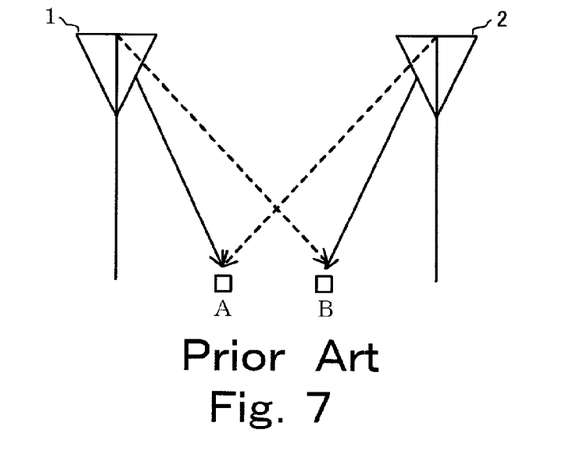
FIG. 7 is a first diagram illustrating a conventional time scheduling scheme.

As shown in FIG. 7 for example, as transmission is occurring simultaneously from base station 1 to terminal A and from base station 2 to terminal B because there is a very short distance between terminal A and terminal B there is a great degree of interference occurring from base station 1 to terminal B and from base station 2 to terminal A.

A conventional method for solving this kind of problem is to have transmission from only one base station or a method whereby closely located multiple base stations transmit to only one terminal. The time scheduling method in "Simple Inter-Cell Coordination Schemes for a High Speed CDMA Packet Downlink" Proceedings of VTC 2000 Spring, Feb. 9, 2002 will now be described with reference to FIGS. 8 and 9.

Figure 8:
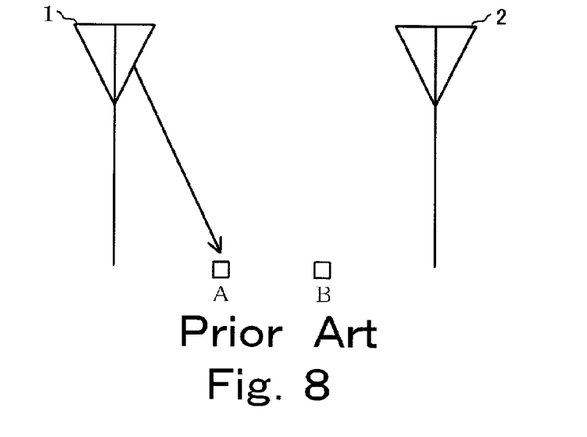
FIG. 8 is a second diagram illustrating a conventional time scheduling scheme.
Figure 9:
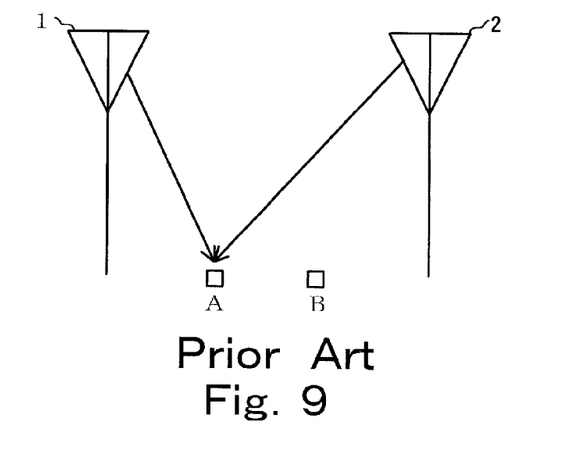
FIG. 9 is a third diagram illustrating a conventional time scheduling scheme.

In FIG. 8 only base station 1 is transmitting and base station 2 does not transmit at the same time, therefore there is no interference directed at terminal A. In FIG. 9 both base station 1 and base station 2 transmit to terminal A. In addition to eliminating interference for terminal A this achieves a diversity effect.

Thus with the conventional time scheduling scheme described, when a terminal is located in a boundary region of respective cells of neighboring base stations transmission can only be performed from one neighboring base station or neighboring base stations can only transmit the same signal to one terminal.

The above problem means that a base station needs time slots when it can be used or carriers are restricted. This leads to an inefficient rate of terminal access.

SUMMARY OF THE INVENTION

Against this background the object of the present invention is to provide a time scheduling scheme that operates so that even with neighboring base stations, carriers of the same frequency can be allocated to their respective terminals in the same time slot, enabling more efficient access between base stations and terminals.

To solve the problem described above the first time scheduling scheme provided by this invention allocates time slots such that when one base station from among neighboring base stations is transmitting to a terminal located in a boundary region of respective cells of the neighboring base stations, other base stations transmit to terminals located in area other than the boundary region.

The second time scheduling scheme provided by this invention operates to allocate time slots such that when one base station from among neighboring base stations transmits to a terminal in a boundary region of respective cells of those base stations in sector i (i being a natural number less than or equal to N) that is one of N sectors (N being an arbitrary natural number) into which the cell is divided, the other base stations transmits to terminals located in area other than the boundary region of respective cells of those base stations in the sector opposing said sector i and boundary regions in either of j (j being an integer 0 to N−1) adjacent sectors neighboring both sides of said opposing sector.

The third time scheduling scheme provided by this invention operates to share among neighboring base stations information on communication quality of terminals in respective cells of those base stations and to allocate time slots such that when any base stations is transmitting to a terminal the communication quality information of which is equal to or below a first threshold, the other base stations transmit to terminals the communication quality information of which is equal to or above a second threshold which is greater than said first threshold.

The fourth time scheduling scheme provided by this invention operates to share among neighboring base stations information on communication quality of terminals in respective cells of those base stations and to allocate time slots such that when any base station is transmitting to a terminal located in sector i (i being a natural number equal to or less than N, and is itself one sector of cell divided into N sectors where N is an arbitrary natural number) the communication quality information of which terminal is equal to or below a first threshold, the other base station transmit to terminals located in the sector opposing said sector i or in either of j (j being an integer of 0 to N−1) adjacent sectors neighboring both sides of said opposing sector and having communication quality information equal to or above a second threshold which is greater than said first threshold, or to a terminal located in area other than said opposing sector and adjacent sectors.

The fifth time scheduling scheme provided by this invention operates to share among neighboring base stations information on communication quality of terminals in respective cells of those base stations wherein the information on communication quality is divided into communication quality classes M (M being a natural integer) and to allocate time slots such that said neighboring base stations simultaneously transmit to terminals that have different communication quality classes.

The sixth time scheduling scheme provided by this invention operates to share among neighboring base stations information on communication quality of terminals in respective cells of those base stations wherein the information on communication quality is divided into communication quality classes M (M being a natural integer) and to allocate time slots such that said neighboring base stations transmit simultaneously to terminals of different communication quality classes and/or terminals located in non opposing sectors.

That is to say, the present invention relates to a time scheduling system for a cellular communication system comprising multiple base stations and multiple terminals wirelessly connected to these multiple base stations, each of said multiple base station includes an allocating means for allocating a different time slot for each of said multiple terminals connected to the base station.

A characteristic of this invention is that the allocating means includes a first allocation means for allocating a different time slot among neighboring base stations for a terminal located in a boundary region of respective cells of these neighboring base stations when each of these neighboring base stations is to communicate with the terminal by allocating a time slot.

Further, it is suitable for the allocating means to include a second allocation means which allocates time slots such that when one of said neighboring base stations is transmitting to a terminal in a boundary region of respective cells of those base stations in sector i (i being a natural number equal to or less than N) that is one of N sectors (N being an arbitrary natural number) into which the cell is divided, the other base stations transmit to terminals located in area other than the boundary region of respective cells of those base stations in the sector opposing said sector i and boundary regions in either of j (j being an integer 0 to N−1) adjacent sectors neighboring both sides of said opposing sector.

Alternatively, the allocating means may include a third allocation means which shares among neighboring base stations information on communication quality of terminals in respective cells of those base stations and allocates time slots such that when any base stations is transmitting to a terminal the communication quality information of which is equal to or below a first threshold, the other base stations transmit to terminals the communication quality information of which is equal to or above a second threshold which is greater than said first threshold.

It is also suitable for the allocating means to provide a fourth allocation means which shares among neighboring base stations information on communication quality of terminals in respective cells of those base stations and allocates time slots such that when any base station is transmitting to a terminal located in sector i (i being a natural number equal to or less than N, and is itself one sector of cell divided into N sectors where N is an arbitrary natural number) the communication quality information of which terminal is equal to or below a first threshold, the other base stations transmit to terminals located in the sector opposing said sector i or in either of j (j being an integer of 0 to N−1) adjacent sectors neighboring both sides of said opposing sector and having communication quality information equal to or above a second threshold which is greater than said first threshold, or to a terminal located in area other than said opposing sector and adjacent sectors.

Alternatively, it may be suitable for the allocating means to include a fifth allocation means which shares among neighboring base stations information on communication quality of terminals in respective cells of those base stations wherein the information on communication quality is divided into communication quality classes M (M being a natural integer) and which allocates time slots such that said neighboring base stations simultaneously transmit to terminals that have different communication quality classes.

Alternatively, it may be suitable for the allocating means to include a sixth allocation means which shares among neighboring base stations information on communication quality of terminals in respective cells of those base stations wherein the information on communication quality is divided into communication quality classes M (M being a natural integer) and which allocates time slots such that said neighboring base stations transmit simultaneously to terminals of different communication quality classes and/or terminals located in non opposing sectors.

It may be suitable for the allocating means to include a seventh allocation means which uses time scheduling from said first allocation means when required communication quality through time scheduling of said first allocation means is satisfied and which allocates time slots such that only one of any of neighboring base stations transmits when required communication quality through time scheduling of said first allocation means is not satisfied.

It may be suitable for the allocating means to include an eighth allocation means which uses time scheduling from said second allocation means when required communication quality through time scheduling of said second allocation means is satisfied and which allocates time slots such that only one of any of neighboring base stations transmits when required communication quality through time scheduling of said second allocation means is not satisfied.

It may be suitable for the allocating means to include a ninth allocation means which uses time scheduling from said third allocation means when required communication quality through time scheduling of said third allocation means is satisfied and which allocates time slots such that only one of any of neighboring base stations transmits when required communication quality through time scheduling of said third allocation means is not satisfied.

It may be suitable for the allocating means to include a tenth allocation means which uses time scheduling from said fourth allocation means when required communication quality through time scheduling of said fourth allocation means is satisfied and which allocates time slots such that only one of any of neighboring base stations transmits when required communication quality through time scheduling of said fourth allocation means is not satisfied.

It may be suitable for the allocating means to includes an eleventh allocation means which uses time scheduling from said fifth allocation means when required communication quality through time scheduling of said fifth allocation means is satisfied and which allocates time slots such that only one of any of neighboring base stations transmit when required communication quality through time scheduling of said fifth allocation means is not satisfied.

It may be suitable for the allocating means to include a twelfth allocation means which uses time scheduling from said sixth allocation means when required communication quality through time scheduling of said sixth allocation means is satisfied and which allocates time slots such that only one of any of neighboring base stations transmits when required communication quality through time scheduling of said sixth allocation means is not satisfied.

It may also be suitable for the allocating means to include a means to allocate a time slot to a terminal which has the lowest communication quality class amongst terminals communication quality classes of which are higher than k (k being a natural number equal to or less than M−1) when there is a vacant slot for allocation for a terminal with communication quality class k.

It may also said be suitable to have a configuration wherein at least one of the base stations amongst neighboring base stations includes a means for lowering data transmission speed, each base station includes a means for transmitting at a uniform transmission power from an antenna with beam directivity perpendicular in relation to the ground, each base station includes a means for controlling transmission power so that the received power of each terminal of each base station is uniform, or each base station includes a means for controlling transmission power so that the received power of each terminal of each base station is uniform and for transmitting from an antenna with beam directivity perpendicular in relation to the ground.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 1:
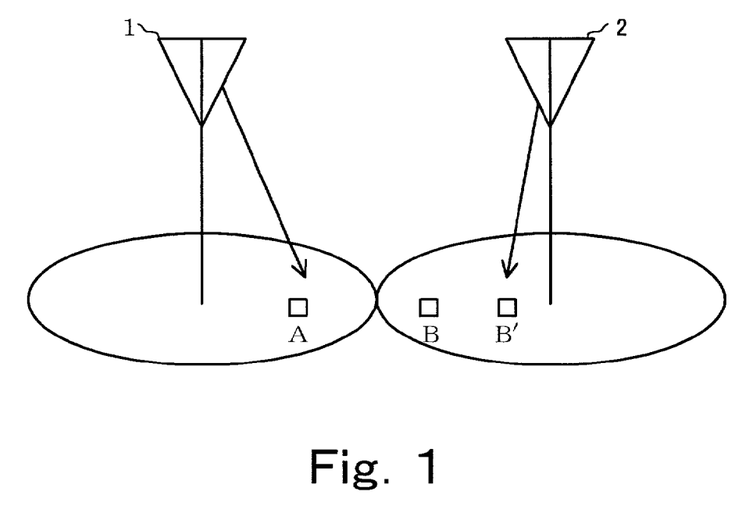
FIG. 1 shows a first embodiment of a time scheduling scheme according to the present invention.

As shown in FIG. 1, the present invention relates to a time scheduling system for a cellular communication system comprising multiple base stations 1 and 2 and multiple terminals A and B wirelessly connected to these multiple base stations 1 and 2 wherein base stations 1 and 2 allocate different time slots for terminals A and B connected to base stations 1 and 2.

The specific feature of this invention is that each of base stations 1 and 2 includes a first allocation means for allocating different time slots between base stations 1 and 2 neighboring each other for terminals A and B located in a boundary region of respective cells of base stations 1 and 2 when each of these neighboring base stations 1 and 2 is to communicate with terminals A and B.

Further, each of base stations 1 and 2 includes a second allocation means which allocates time slots such that when one of neighboring base stations 1 and 2 is transmitting to a terminal in a boundary region of respective cells of those base stations 1 and 2 in sector i (i being a natural number equal to or less than N) that is one of N sectors (N being an arbitrary natural number) into which the cell is divided, the other base station 2 or 1 transmits to terminals located in area other than the boundary region of respective cells of those base stations 1 and 2 in the sector opposing said sector i and boundary regions in either of j (j being an integer 0 to N−1) adjacent sectors neighboring both sides of said opposing sector.

Alternatively, each of base stations 1 and 2 may include a third allocation means which shares among neighboring base stations 1 and 2 information on communication quality of terminals A and B in respective cells of those base stations 1 and 2 and allocates time slots such that when either base station 1 or 2 is transmitting to terminal A or B the communication quality information of which is equal to or below a first threshold, the other base station 2 or 1 transmits to either terminal B or A the communication quality information of which is equal to or above a second threshold which is greater than said first threshold.

Alternatively, each of base stations 1 and 2 may include a fourth allocation means which shares among neighboring base stations 1 and 2 information on communication quality of terminals A and B in respective cells of those base stations 1 and 2 and allocates time slots such that when either base station 1 or 2 is transmitting to terminal A or B located in sector i (i being a natural number equal to or less than N, and is itself one sector of cell divided into N sectors where N is an arbitrary natural number) the communication quality information of which terminal is equal to or below a first threshold, the other base station 2 or 1 transmits to terminal B or A located in the sector opposing said sector i or in either of j (j being an integer of 0 to N−1) adjacent sectors neighboring both sides of said opposing sector and having communication quality information equal to or above a second threshold which is greater than said first threshold, or to a terminal located in area other than said opposing sector and adjacent sectors.

Alternatively, each of base stations 1 and 2 may include a fifth allocation means which shares among neighboring base stations 1 and 2 information on communication quality of terminals A and B in respective cells of those base stations 1 and 2 wherein the information on communication quality is divided into communication quality classes M (M being a natural integer) and which allocates time slots such that neighboring base stations 1 and 2 simultaneously transmit to terminals A and B that have different communication quality classes.

Alternatively, each of base stations 1 and 2 may include a sixth allocation means which shares among neighboring base stations 1 and 2 information on communication quality of terminals A and B in respective cells of those base stations 1 and 2 wherein the information on communication quality is divided into communication quality classes M (M being a natural integer) and which allocates time slots such that neighboring base stations 1 and 2 transmit simultaneously to terminals of different communication quality classes and/or terminals located in non opposing sectors.

Alternatively, each of base stations 1 and 2 may include a seventh allocation means which uses time scheduling from the first allocation means when required communication quality through time scheduling of the first allocation means is satisfied and which allocates time slots such that only one of any of neighboring base stations 1 and 2 transmits when required communication quality through time scheduling of the first allocation means is not satisfied.

Alternatively, each of base stations 1 and 2 may include an eighth allocation means which uses time scheduling from the second allocation means when required communication quality through time scheduling of the second allocation means is satisfied and which allocates time slots such that only one of any of neighboring base stations 1 and 2 transmits when required communication quality through time scheduling of the second allocation means is not satisfied.

Alternatively, each of base stations 1 and 2 may include a ninth allocation means which uses time scheduling from the third allocation means when required communication quality through time scheduling of the third allocation means is satisfied and which allocates time slots such that only one of any of neighboring base stations 1 and 2 transmits when required communication quality through time scheduling of the third allocation means is not satisfied.

Alternatively, each of base stations 1 and 2 includes a tenth allocation means which uses time scheduling from the fourth allocation means when required communication quality through time scheduling of the fourth allocation means is satisfied and which allocates time slots such that only one of any of neighboring base stations 1 and 2 transmits when required communication quality through time scheduling of the fourth allocation means is not satisfied.

Alternatively, each of base stations 1 and 2 includes an eleventh allocation means which uses time scheduling from the fifth allocation means when required communication quality through time scheduling of the fifth allocation means is satisfied and which allocates time slots such that only one of any of neighboring base stations 1 and 2 transmit when required communication quality through time scheduling of the fifth allocation means is not satisfied.

Alternatively, each of base stations 1 and 2 may include a twelfth allocation means which uses time scheduling from the sixth allocation means when required communication quality through time scheduling of the sixth allocation means is satisfied and which allocates time slots such that only one of any of neighboring base stations 1 and 2 transmits when required communication quality through time scheduling of the sixth allocation means is not satisfied.

Further, either base station 1 or 2 at least of neighboring base stations 1 and 2 may perform data transmission at a lower speed.

Alternatively, each of base stations 1 and 2 may include a means to allocate a time slot to terminal A or B which has the lowest communication quality class amongst these terminals A and B communication quality classes of which are higher than k (k being a natural number equal to or less than M−1) when there is a vacant slot for allocation for a terminal with communication quality class k.

Each of base stations 1 and 2 may transmit at a uniform transmission power from an antenna with beam directivity perpendicular in relation to the ground.

Each of base stations 1 and 2 may control transmission power so that the received power of each terminal of each base station is uniform.

Each of base stations 1 and 2 may control transmission power so that the received power of each terminal of each base station is uniform and transmits from an antenna with beam directivity perpendicular in relation to the ground.

The present invention will now be described with reference to the drawings. FIG. 1 shows a first embodiment of a time scheduling scheme according to the present invention. In FIG. 1 base station 1 transmits to terminal A on cell periphery. To avoid interference on terminal A and to avoid strong interference from base station 1 on terminals under base station 2 itself, base station 2 transmits not to terminal B on cell periphery but to terminal B' near base station.

As a method for ascertaining whether or not a terminal is located on cell periphery, it is conceivable for example to measure communication quality information like received power of the terminal or a ratio of received power to interference power, which information is transmitted to a base station from a terminal with a decision being made that the terminal is located on cell periphery if the communication quality information thus measured does not satisfy a required threshold.

Figure 2:
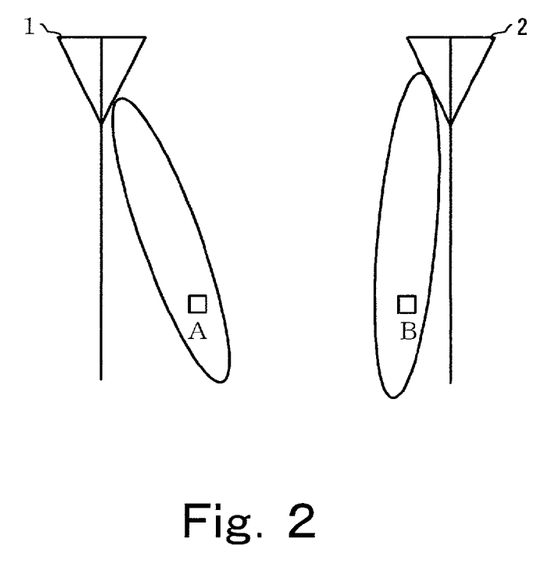
FIG. 2 is an explanatory drawing showing a first embodiment of a time scheduling scheme according to the present invention.

As shown in FIG. 2, a base station uses an antenna with beam directivity perpendicular in relation to the ground for transmission. Conditions when there is a uniform transmission power will now be described with reference to FIGS. 3 and 4.

Figure 3:
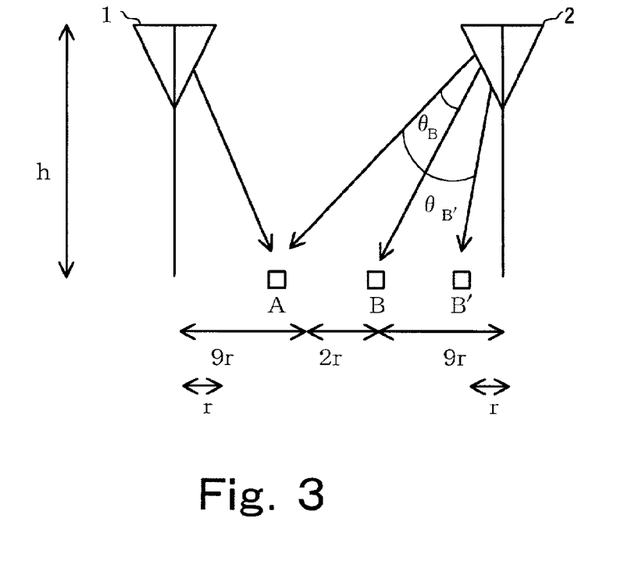
FIG. 3 is a first diagram illustrating the effectiveness of an embodiment of a time scheduling scheme according to the present invention.

As shown in FIG. 3, when base station 1 transmits to terminal A (distance from base station 1 being $9r$) on cell periphery, if base station 2 transmits to terminal B (distance from base station 2 is $9r$) located in the cell boundary region, an assessment is made of interference from base station 2 to terminal A where base station 2 transmits to the more closely located terminal B' (distance from base station 2 is r). To simplify, suppose terminals are located on a straight line connecting base station 1 and base station 2.

Interference power is in inverse proportion to distance to the power of α and decreases as the angle from the center of the beam of base station 2 increases. When base station 2 transmits to terminal B, interference $I_{B-A}$ on terminal A can be expressed as follows.

$$I_{B-A}=P_{max} \times f(\theta_B)/\{h^2+(11r)^2\}^{\alpha/2}$$

$$\theta_B=\cos^{-1} [h/\{h^2+(11r)^2\}^{1/2}]-\cos^{-1} [h/\{h^2+(9r)^2\}^{1/2}]$$

wherein, h is the height of the base station. When base station 2 transmits to terminal B' interference $I_{B'-A}$ on terminal A is expressed as follows.

$$I_{B'-A}=P_{max} \times f(\theta_{B'})/\{h^2+(11r)^2\}^{\alpha/2}$$

$$\theta_{B'}=\cos^{-1} [h/\{h^2+(11r)^2\}^{1/2}]-\cos^{-1} [h/\{h^2+r^2\}^{1/2}]$$

wherein, $P_{max}$ represents transmission power of a base station and $f(\theta_{B'})$ represents antenna beam directivity perpendicular in relation to the ground, being a function where the value decreases in relation to the increase of $\theta_{B'}$, the maximum value being 1. If h=1, α=2, $$I_{B-A}=P_{max} \times f(\theta_B)/122$$

$$\theta_B=\cos^{-1} [1/122^{1/2}]-\cos^{-1} [1/82^{1/2}]=1.15 \text{ deg}$$

$$I_{B'-A}=P_{max} \times f(\theta_{B'})/122$$

$$\theta_{B'}=\cos^{-1} [1/122^{1/2}]-\cos^{-1} [1/2^{1/2}]=39.81 \text{ deg}$$

Accordingly, the ratio of $I_{B'-A}/I_{B-A}$ is $$I_{B'-A}/I_{B-A}=f(39.81 \text{ deg})/f(1.15 \text{ deg})$$

so the effects of interference suppression increase in proportion to the acuteness of the degree of antenna directivity.

Next, interference from base station 2 where terminal A' is located close to base station 1 is assessed. In this situation, interference is increased through the introduction of the scheme proposed by this invention. When base station 2 transmits to terminal B interference $I_{B-A'}$ on terminal A' is expressed as follows.

$$I_{B-A'}=P_{max} \times f(\theta_B)/\{h^2+(19r)^2\}$$

$$\theta_B=\cos^{-1} [h/\{h^2+(19r)^2\}^{1/2}]-\cos^{-1} [h/\{h^2+(9r)^2\}^{1/2}]$$

Further, when base station 2 transmits to terminal B' interference $I_{B'-A'}$ on terminal A' is expressed as follows.

$$I_{B'-A'}=P_{max} \times f(\theta_B)/\{h^2+(19r)^2\}$$

$$\theta_{B'}=\cos^{-1} [h/\{h^2+(19r)^2\}^{1/2}]-\cos^{-1} [h/\{h^2+r^2\}^{1/2}]$$

If h=1, α=2, these expressions are expressed as follows.

$$I_{B-A'}=P_{max} \times f(\theta_B)/362$$

$$\theta_B=\cos^{-1} [1/362^{1/2}]-\cos^{-1} [1/82^{1/2}]=3.33 \text{ deg}$$

$$I^{B'-A'}=P_{max} \times f(\theta_{B'})/362$$

$$\theta_{B'}=\cos^{-1} [1/362^{1/2}]-\cos^{-1} [1/2^{1/2}]=26.99 \text{ deg}$$

Accordingly, the ratio of $I_{B-A'}$ to $I_{B'-A'}$ is $$I_{B-A'}/I_{B'-A'}=f(3.33 \text{ deg})/f(26.99 \text{ deg})$$

Accordingly, with the scheme proposed by this invention there is an increase in interference in comparison to conditions under the conventional methodology where both base stations transmit to terminals near base station.

Best SIR for terminals under base station 1, following the conventional methodology would be base station 1 to terminal A' and base station 2 to terminal B', while with the scheme proposed by this invention this would be base station 1 to terminal A' and base station 2 to terminal B. Worst SIR of terminals under base station 1, following the conventional methodology would be base station 1 to terminal A and base station 2 to terminal B, with the scheme proposed by this invention this is base station 1 to terminal A and base station 2 to terminal B'. If received power of terminal A is $S_A$ and received power of terminal A' is $S_{A'}$, $$S_A = P_{max}/\{h^2+(9r)^2\} = P_{max}/82$$

$$S_{A'} = P_{max}/\{h^2+r^2\} = P_{max}/2$$

If, under the conventional methodology maximum SIR is $SIR_{A'B'}$ and minimum SIR is $SIR_{AB}$ $$SIR_{A'B'} = S_{A'}/I_{B'-A'} = P_{max}/2/\{P_{max} \times f(26.99 \text{ deg})/362\} = 181/f(26.99 \text{ deg})$$

$$SIR_{AB} = S_A/I_{B-A} = P_{max}/82/\{P_{max} \times f(1.15 \text{ deg})/122\} = 1.5/f(1.15 \text{ deg})$$

This ratio, $SIR_{A'B'}/SIR_{AB}$ is $$SIR_{A'B'}/SIR_{AB} = 121 \times f(1.15 \text{ deg})/f(26.99 \text{ deg})$$

The ratio is 121 times on an antenna with no directivity, the ratio is 121 times, while this value rises further on a directive antenna and the difference in communication quality between the different terminals increases.

Next, under the scheme proposed by this invention if maximum SIR is $SIR_{A'B}$, and minimum SIR is $SIR_{AB'}$ $$SIR_{A'B} = S_{A'}/I_{B-A'} = P_{max}/2/\{P_{max} \times f(3.33 \text{ deg})/362\} = 181/f(3.33 \text{ deg})$$

$$SIR_{AB'} = S_A/I_{B'-A} = P_{max}/82/\{P_{max} \times f(39.81 \text{ deg})/122\} = 1.5/f(39.81 \text{ deg})$$

The ratio $SIR_{A'B}/SIR_{AB'}$ is $$SIR_{A'B}/SIR_{AB'} = 121 \times f(39.81 \text{ deg})/f(3.33 \text{ deg})$$

As transmission power is uniform, the ratio is 121 times on an antenna with no directivity, unchanged from the conventional methodology. However, the sharper antenna directivity is, the smaller this value becomes so rectification of the difference in communication quality between different terminals is conceivable.

As described, by using the scheme proposed by this invention, even when base station 1 and base station 2 are transmitting simultaneously interference towards a terminal on cell periphery can be suppressed and the difference in communication quality between a terminal near base station and a terminal on cell periphery of the base station can be rectified.

Figure 4:
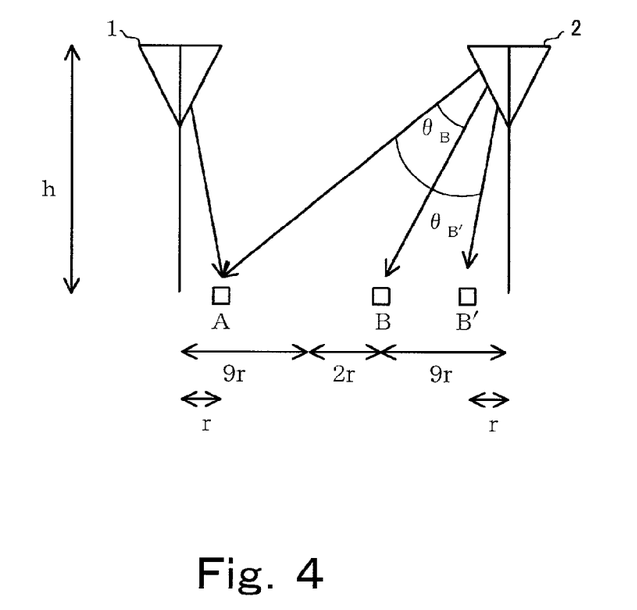
FIG. 4 is a second diagram illustrating the effectiveness of an embodiment of a time scheduling scheme according to the present invention.

Conditions where a terminal transmits using an antenna with beam directivity perpendicular in relation to the ground, and transmission power is controlled so that received power of each terminal is uniform will now be described with reference to FIGS. 3 and 4.

Where transmission power is controlled, interference $I_{B-A}$ on terminal A when base station 2 transmits to terminal B, can be expressed as follows.

$$I_{B-A} = P_C/[\{h^2+(11r)^2\}^{1/2} - \{h^2+(9r)^2\}^{1/2}]^\alpha$$

Interference $I_{B'-A}$ on terminal A when base station 2 transmits to terminal B' is expressed as follows.

$$I_{B'-A} = P_C/[\{h^2+(11r)^2\}^{1/2} - \{h^2+r^2\}^{1/2}]^\alpha$$

wherein, $P_C$ indicates received power of the terminal. If $r=h=1$ and $\alpha=2$, $$I_{B-A} = P_C/[122^{1/2} - 82^{1/2}]^2 = P_C/3.96$$

$$I_{B'-A} = P_C/[122^{1/2} - 2^{1/2}]^2 = P_C/92.76$$

Accordingly, the ratio of $I_{B'-A}$ to $I_{B-A}$ is $$I_{B'-A}/I_{B-A} = 0.04$$

and interference decreases substantially.

Next, interference from base station 2 where terminal A' is located close to base station 1 is assessed. In this situation, interference is increased through the introduction of the scheme proposed by this invention. When base station 2 transmits to terminal B interference $I_{B-A'}$ on terminal A' is expressed as follows.

$$I_{B-A'} = P_C/[\{h^2+(19r)^2\}^{1/2} - \{h^2+(9r)^2\}^{1/2}]^2$$

Further, when base station 2 transmits to terminal B' interference $I_{B'-A}$ on terminal A is expressed as follows.

$$I_{B-A'} = P_C/[\{h^2+(19r)^2\}^{1/2} - \{h^2+(9r)^2\}^{1/2}]^2$$

If $r=h=1$, $$I_{B-A'} = P_C[362^{1/2} - 82^{1/2}]^2 = P_C/99.42$$

$$I_{B'-A'} = P_C/[362^{1/2} - 2^{1/2}]^2 = P_C/310.19$$

Therefore, the ratio of $I_{B-A'}$ to $I_{B'-A'}$ is $$I_{B-A'}/I_{B'-A'} = 3.12$$

Accordingly, with the scheme proposed by this invention there is an increase in interference in comparison to conditions under the conventional methodology where both base stations transmit to terminals near base station. However, this is small in comparison to the level of interference suppression (0.04 times), occurring for a terminal under base station 1 on cell periphery.

Best SIR for terminals under base station 1, following the conventional methodology would be base station 1 to terminal A' and base station 2 to terminal B', while with the scheme proposed by this invention this would be base station 1 to terminal A' and base station 2 to terminal B. Worst SIR of terminals under base station 1, following the conventional methodology would be base station 1 to terminal A and base station 2 to terminal B, with the scheme proposed by this invention providing base station 1 to terminal A and base station 2 to terminal B'. If received power of terminal A is $S_A$ and received power of terminal A' is $S_{A'}$, $$S_A = P_C$$

$$S_{A'} = P_C$$

Under the conventional methodology if maximum SIR is $SIR_{A'B'}$, and minimum SIR is $SIR_{AB}$ $$SIR_{A'B'}=S_A/I_{B'-A'}=P_C/\{P_C/310.19\}=310.19$$

$$SIR_{AB}=S_A/I_{B-A}=P_C/\{P_C/3.96\}=3.96$$

This ratio $SIR_{A'B'}/SIR_{AB}$ is $$SIR_{A'B'}/SIR_{AB}=78.33$$

resulting in a substantial difference in communication quality between different terminals.

Under the scheme proposed by this invention if maximum SIR is $SIR_{A'B}$ and minimum SIR is $SIR_{AB'}$ $$SIR_{A'B}=S_A/I_{B-A'}=P_C/\{P_C/99.42\}=99.42$$

$$SIR_{AB'}=S_A/I_{B'-A}=P_C/\{P_C/92.76\}=92.76$$

This ratio $SIR_{A'B}/SIR_{AB'}$ is $$SIR_{A'B}/SIR_{AB'}=1.07$$

and the difference in communication quality between different terminals is rectified in comparison to the conventional methodology.

As described, by using the scheme proposed by this invention, even when base station 1 and base station 2 are transmitting simultaneously interference towards a terminal on cell periphery can be suppressed and the difference in communication quality between a terminal near base station and a terminal on cell periphery of the base station can be rectified.

Conditions where a terminal transmits using an antenna with beam directivity perpendicular to the ground, and transmission power is controlled so that received power of each terminal is uniform will now be described with reference to FIGS. 3 and 4.

Where there is both transmission power control+antenna directivity inclination, interference $I_{B-A}$ on terminal A when base station 2 transmits to terminal B, can be expressed as follows.

$$I_{B-A}=P_C \times f(\theta_B)/[\{h^2+(11r)^2\}^{1/2}-\{h^2+(9r)^2\}^{1/2}]^2$$

$$\theta_B=\cos^{-1}[h/\{h^2+(11r)^2\}^{1/2}]-\cos^{-1}[h/\{h^2+(9r)^2\}^{1/2}]$$

When base station 2 transmits to terminal B' interference $I_{B'-A}$ on terminal A is expressed as follows.

$$I_{B'-A}=P_C \times f(\theta_{B'})/[\{h^2+(11r)^2\}^{1/2}-\{h^2+r^2\}^{1/2}]^2$$

$$\theta_{B'}=\cos^{-1}[h/\{h^2+(11r)^2\}^{1/2}]-\cos^{-1}[h/\{h^2+r^2\}^{1/2}]$$

wherein, $P_C$ indicates received power of the terminal. If r=h=1, $$I_{B-A}=P_C \times f(\theta_B)/[122^{1/2}-82^{1/2}]^2=P_C \times f(\theta_B)/3.96$$

$$\theta_B=\cos^{-1}[1/122^{1/2}]-\cos^{-1}[1/82^{1/2}]=1.15 \text{ deg}$$

$$I_{B'-A}=P_C \times f(\theta_{B'})/[122^{1/2}-2^{1/2}]^2=P_C \times f(\theta_{B'})/92.6$$

$$\theta_{B'}=\cos^{-1}[1/122^{1/2}]-\cos^{-1}[1/2^{1/2}]=39.81 \text{ deg}$$

Accordingly, the ratio of $I_{B'-A}$ to $II_{B-A}$ is $$I_{B'-A}/I_{B-A}=0.04 \times f(39.81 \text{ deg})/f(1.15 \text{ deg})$$

resulting in a substantial decrease in interference. The sharper antenna directivity is, the more it becomes effective.

Next, interference from base station 2 where terminal A' is located close to base station 1 is assessed. In this situation, interference is increased through the introduction of the scheme proposed by this invention.

When base station 2 transmits to terminal B interference $I_{B-A'}$ on terminal A' is expressed as follows.

$$I_{B-A'}=P_C \times f(\theta_B)/[\{h^2+(19r)^2\}^{1/2}-\{h^2+(9r)^2\}^{1/2}]^\alpha$$

$$\theta_B=\cos^{-1}[h/\{h^2+(19r)^2\}^{1/2}]-\cos^{-1}[h/\{h^2+(9r)^2\}^{1/2}]$$

Further, when base station 2 transmits to terminal B' interference $I_{B'-A}$ on terminal A' is expressed as follows.

$$I_{B'-A}=P_C \times f(\theta_{B'})/[\{h^2+(19r)^2\}^{1/2}-\{h^2+r^2\}^{1/2}]^\alpha$$

$$\theta_{B'}=\cos^{-1}[h/\{h^2+(19r)^2\}^{1/2}]-\cos^{-1}[h/\{h^2+r^2\}^{1/2}]$$

If r=h=1 and $\alpha$=2, $$I_{B-A'}=P_C \times f(\theta_B)/[362^{1/2}-82^{1/2}]^2=P_C \times f(\theta_B)/99.42$$

$$\theta_B=\cos^{-1}[1/362^{1/2}]-\cos^{-1}[1/82^{1/2}]=3.33 \text{ deg}$$

$$I_{B'-A'}=P_C \times f(\theta_{B'})/[362^{1/2}-2^{1/2}]^2=P_C \times f(\theta_{B'})/310.19$$

$$\theta_{B'}=\cos^{-1}[1/362^{1/2}]-\cos^{-1}[1/2^{1/2}]=26.99 \text{ deg}$$

Accordingly, the ratio of $I_{B-A'}$ to $I_{B'-A'}$ is $$I_{B-A'}/I_{B'-A'}=3.12 \times f(3.33 \text{ deg})/f(26.99 \text{ deg})$$

Accordingly, with the scheme proposed by this invention there is an increase in interference in comparison to conditions under the conventional methodology where both base stations transmit to terminals near base station. However, this is small in comparison to the level of interference suppression occurring for a terminal under base station 1 on cell periphery.

For best SIR for terminals under base station 1, following conventional methodology would be base station 1 to terminal A' and base station 2 to terminal B', while with the scheme proposed by this invention this would be base station 1 to terminal A' and base station 2 to terminal B. Worst SIR for terminals under base station 1, following the conventional methodology would be base station 1 to terminal A and base station 2 to terminal B, with the scheme proposed by this invention this is base station 1 to terminal A and base station 2 to terminal B'. If received power of terminal A is $S_A$ and received power of terminal A' is $S_{A'}$ $$S_A=P_C$$

$$S_{A'}=P_C$$

If, under the conventional methodology, maximum SIR is $SIR_{A'B'}$ and minimum SIR is $SIR_{AB}$, $$SIR_{A'B'}=S_A/I_{A'-B'}=P_C/\{P_C \times f(26.99 \text{ deg})/310.19\}=310.19/f(26.99 \text{ deg})$$

$$SIR_{AB}=S_A/I_{A-B}=P_C/\{P_C \times f(1.15 \text{ deg})/3.96\}=3.96/f(1.15 \text{ deg})$$

The ratio, $SIR_{A'B'}/SIR_{AB}$ is $$SIR_{A'B'}/SIR_{AB}=78.33 \times f(1.15 \text{ deg})/f(26.99 \text{ deg})$$

and the difference in communication quality between different terminals increases. The sharper antenna directivity is, the greater the difference is.

Next, under the scheme proposed by this invention, if maximum SIR is $SIR_{A'B}$ and minimum SIR is $SIR_{AB'}$ $$SIR_{A'B}=S_A/I_{B-A'}=P_C/\{P_C \times f(3.33 \text{ deg})/99.42\}=99.42/f(3.33 \text{ deg})$$

$$SIR_{AB'}=S_A/I_{B'-A}=P_C/\{P_C \times f(39.81 \text{ deg})/92.76\}=92.76/f(39.81 \text{ deg})$$

The ratio $SIR_{A'B}/SIR_{AB'}$ is $$SIR_{A'B}/SIR_{AB'}=1.07 \times f(39.81 \text{ deg})/f(3.33 \text{ deg})$$

and the difference in communication quality between different terminals is rectified in comparison to conventional methodology. As the antenna directivity becomes more acute for a terminal under base station 1, SIR increases when a terminal is on cell periphery becoming larger than a terminal near base station.

As described, by using the scheme proposed by this invention, even when base station 1 and base station 2 are transmitting simultaneously interference towards a terminal on cell periphery can be suppressed and the difference in communication quality between a terminal near base station and a terminal on cell periphery of the base station can be rectified.

Figure 5:
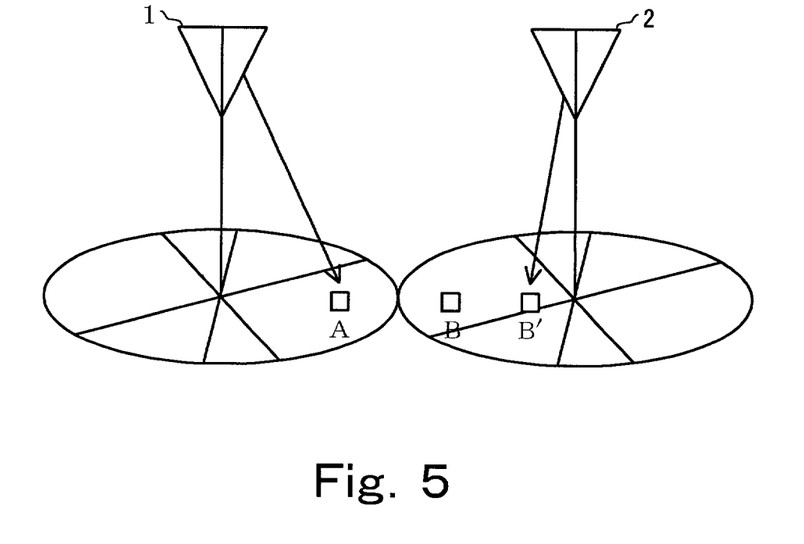
FIG. 5 is a drawing showing a second embodiment of a time scheduling scheme according to the present invention.

Further aspects of the invention will now be described with reference to the drawings. FIG. 5 shows a second embodiment according to the present invention. In FIG. 5 a cell is divided into 6 sectors and base station 1 transmits to terminal A on cell periphery in one sector. Where transmitting to a sector opposing a sector to which base station 1 transmits, base station 2 transmits not to terminal B on cell periphery but to terminal B' near base station to avoid interference on terminal A and to avoid strong interference from base station 1 on terminals under base station 2 itself. Where transmitting to a sector outside a sector opposing a sector to which base station 1 transmits, base station 2 can transmit to terminal B on cell periphery.

Figure 6:
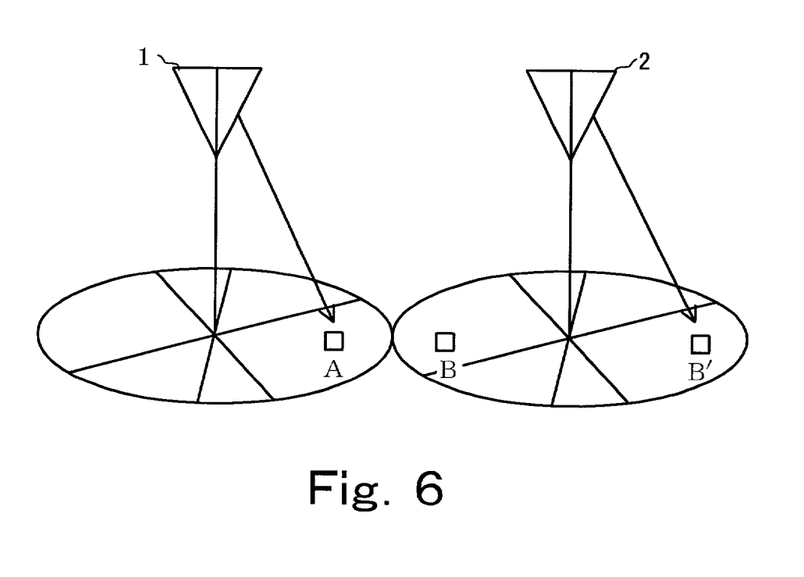
FIG. 6 is an explanatory drawing showing a second embodiment of a time scheduling scheme according to the present invention.

For example, as shown in FIG. 6 where both terminals transmit to mutually non opposing sectors, even when both terminals transmit simultaneously to terminals on cell periphery, because those terminals are separated by a substantial distance, interference from base station 1 to terminal B' and from base station 2 to terminal A is weak.

As described, by using the scheme proposed by this invention, even when base station 1 and base station 2 are transmitting simultaneously interference towards a terminal on cell periphery can be suppressed and the difference in communication quality between a terminal near base station and a terminal on cell periphery can be rectified.

As described, with the present invention even when closely located multiple base stations transmit simultaneously to their respective different terminals, interference towards a terminal on cell periphery can be suppressed and the difference in communication quality between a terminal near base station and a terminal on cell periphery can be rectified, thereby enabling more efficient access between base stations and terminals.

What is claimed is:

1. A cellular communication system, comprising:
a plurality of base stations that have respective communication areas with boundary regions that meet; and
plural terminals that communicate wirelessly with said base stations, each of said terminals being allocated a time slot from one of said base stations with which the respective terminal communicates;
wherein, when a first one of said terminals that communicates with a first one of said base stations using a first frequency and a second one of said terminals that communicates with a second one of said base stations using the first frequency are located in the boundary regions of said first and second ones of said base stations, said first and second ones of said base stations allocate different time slots to said first and second ones of said terminals, and
wherein, when said first one of said terminals that communicates with said first one of said base stations using the first frequency is located in the boundary regions of said first and second base stations when said second one of said terminals that communicates with said second one of said base stations using the first frequency is located out of the communication area of said first one of said base stations and out of the boundary regions of said first and second ones of said base stations, said first and second ones of said base stations are permitted to allocate a same time slot to said first and second ones of said terminals.

2. The system of claim 1, wherein said first one of said terminals has a communication quality that is equal to or below a first threshold and said second one of the terminals has a communication quality that is equal to or above a second threshold that is greater than the first threshold.

3. The system of claim 1, wherein a communication quality of said first and second ones of said terminals is divided into plural communication quality classes that are different from each other, said first one of said terminals being in a first communication quality class and said second one of the terminals being in a second communication quality class.

4. A cellular communication system, comprising:
first and second base stations that have respective communication areas with boundary regions that meet;
plural terminals that communicate wirelessly with said first and second base stations, a first one of said terminals being located in the boundary regions of said first and second base stations and a second one of said terminals being located between said second base station and the boundary region of said second base station and out of the communication area of said first base station; and
each of said first and second base stations being allocated time slots for communicating with the first and second terminals, wherein the first one of said terminals communicates with said first base station only in first time slots and communicates with said second base station only in second time slots different from the first time slots, and wherein the second one of said terminals communicates with the second base station in the first time slots,
wherein the communication areas of said first and second base stations are divided into sectors and the first one of the terminals is in the boundary region of a first one of the sectors of said first base station, and wherein the second one of said terminals is located in an area other than the boundary region of said second base station that is in a second sector of said second base station opposite the first sector of said first base station and other than the boundary region of said second base station that is in third and fourth sectors of said second base station directly adjacent to the second sector.

5. A cellular communication system, comprising:
first and second base stations that have respective communication areas with boundary regions that meet;
plural terminals that communicate wirelessly with said first and second base stations, a first one of said terminals having a communication quality that is equal to or below a first threshold and a second one of the terminals having a communication quality that is equal to or above a second threshold that is greater than the first threshold; and each of said first and second base stations being allocated time slots for communicating with the first and second terminals, wherein the first one of said terminals communicates with said first base station only in first time slots and communicates with said second base station only in second time slots different from the first time slots, and wherein the second one of said terminals communicates with the second base station in the first time slots, wherein the communication areas of said first and second base stations are divided into sectors and the first one of the terminals is in a first one of the sectors of said first base station, and wherein the second one of said terminals is located in an area other than a second sector of said second base station opposite the first sector of said first base station and other than third and fourth sectors of said second base station directly adjacent to the second sector.

6. A cellular communication system, comprising:

first and second base stations that have respective communication areas with boundary regions that meet;

plural terminals that communicate wirelessly with said first and second base stations, a first one of said terminals having a communication quality that is equal to or below a first threshold and a second one of the terminals having a communication quality that is equal to or above a second threshold that is greater than the first threshold; and each of said first and second base stations being allocated time slots for communicating with the first and second terminals, wherein the first one of said terminals communicates with said first base station only in first time slots and communicates with said second base station only in second time slots different from the first time slots, and wherein the second one of said terminals communicates with the second base station in the first time slots, wherein the communication areas of said first and second base stations are divided into sectors and the first one of the terminals is in a first one of the sectors of said first base station, and the second one of said terminals is located in a second sector of said second base station opposite the first sector of said first base station or in a third or a fourth sector of said second base station directly adjacent to the second sector, and wherein the second one of said terminals communicates with the second base station in the first time slots only when the communication quality of the second one of said terminals is equal to or above the second threshold.

* * * * *